(12) United States Patent
Wu et al.

(10) Patent No.: US 11,289,795 B2
(45) Date of Patent: Mar. 29, 2022

(54) ANTENNA-IN-PACKAGE MODULE AND ELECTRONIC DEVICE

(71) Applicant: AAC Technologies Pte. Ltd., Singapore (SG)

(72) Inventors: Jing Wu, Shenzhen (CN); Ke Hua, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/991,001

(22) Filed: Aug. 11, 2020

(65) Prior Publication Data

US 2020/0411949 A1    Dec. 31, 2020

Related U.S. Application Data

(63) Continuation of application No. PCT/CN2019/094046, filed on Jun. 30, 2019.

(51) Int. Cl.
| | |
|---|---|
| *H01Q 1/22* | (2006.01) |
| *H01Q 1/24* | (2006.01) |
| *H01Q 19/00* | (2006.01) |
| *H01Q 21/00* | (2006.01) |
| *H01Q 21/06* | (2006.01) |
| *H01Q 21/22* | (2006.01) |
| *H04M 1/02* | (2006.01) |

(52) U.S. Cl.
CPC ........... *H01Q 1/2283* (2013.01); *H01Q 1/243* (2013.01); *H01Q 19/005* (2013.01); *H01Q 21/0025* (2013.01); *H01Q 21/065* (2013.01); *H01Q 21/22* (2013.01); *H04M 1/0283* (2013.01)

(58) Field of Classification Search
CPC .... H01Q 1/2283; H01Q 1/243; H01Q 19/005; H01Q 21/0025; H01Q 21/065; H01Q 21/22; H01Q 21/08; H01Q 9/0457; H01Q 1/36; H01Q 1/50; H01Q 3/26; H01Q 9/0414; H01Q 9/045; H04M 1/0283; H04M 1/026
See application file for complete search history.

(56) References Cited

U.S. PATENT DOCUMENTS

| | | | | |
|---|---|---|---|---|
| 5,220,335 | A * | 6/1993 | Huang | ..... H01Q 1/38 343/700 MS |
| 2015/0070228 | A1* | 3/2015 | Gu | ..... H01Q 1/2283 343/727 |
| 2017/0309991 | A1* | 10/2017 | Noori | ..... H01Q 1/241 |
| 2018/0331418 | A1* | 11/2018 | Kim | ..... H01Q 9/0414 |
| 2019/0326672 | A1* | 10/2019 | Lim | ..... H01Q 21/28 |
| 2020/0083948 | A1* | 3/2020 | Lim | ..... H01Q 1/243 |

* cited by examiner

*Primary Examiner* — David E Lotter
(74) *Attorney, Agent, or Firm* — W&G Law Group

(57) ABSTRACT

The invention provides an antenna-in-package module and an electronic device. The antenna-in-package module comprises a substrate, an antenna module and an integrated circuit chip arranged on opposite two sides of the substrate and a circuit arranged in the substrate to connect the antenna module and the integrated circuit chip. The antenna module comprises a plurality of antenna units connected to the circuit and a plurality of guiding directors arranged separated from each antenna unit, separately. The antenna-in-package module provided by the invention can increase spatial coverage of the antenna-in-package module.

7 Claims, 3 Drawing Sheets

ANTENNA-IN-PACKAGE MODULE AND ELECTRONIC DEVICE

FIELD OF THE PRESENT DISCLOSURE

The invention relates to the field of communication technologies, in particular to an antenna-in-package module and an electronic device using such an antenna-in-package module.

DESCRIPTION OF RELATED ART 5G serves as a development and research focus in the industry all over the world and development of 5G technology and formulation of 5G standard have become consensus in the industry. International Telecommunication Union ITU has explicated three major application scenes of 5G: enhanced mobile broadband, large scale machine communication and high reliability low delay communication in the 22th session of ITU-RWP5D held in June, 2015. The three application scenes correspond to different key indexes, separately. The peak velocity of a user in the enhanced mobile broadband scene is 20 Gbps and the lowest user experience rate is 100 Mbps.

3GPP is standardizing the 5G technology. The first 5G NSA national standard has been accomplished and frozen in December, 2017. 5G independent networking standard has been accomplished on 14 Jun. 2018.

Rich bandwidth resources of millimeter wave frequency bands guarantee the high speed transmission rate. However, it is needed to adopt an architecture of a phased array by a wireless communication system using the millimeter wave frequency bands due to several spatial loss of electromagnetic waves in the frequency bands.

An antenna serves as indispensable parts in a radio frequency front end system. System integration and packaging on the antenna and a radio frequency front end circuit become an inevitable trend of development of future radio frequency front ends while the radio frequency circuit develops toward integrated and miniaturized directions. Antenna-in-Package (AiP) technology integrating the antenna in a package carrying a chip by means of a packaging material and a packaging process gives consideration of antenna performance, cost and volume well, and is highly appreciated by wide chip and package manufacturers. At present, companies such as Qualcomm, Intel and IBM adopt the AiP technology. It is no doubt that the AiP technology will provide a good antenna solution for 5G millimeter wave mobile communication system.

As far as 5G millimeter wave frequency band is concerned, 3GPP provides several standard working frequency bands: n257 (26.5 GHz-29.5 GHz), n258 (24.25-27.5 GHz), n260 (37-40 GHZ) and n261 (27.5-28.35 GHZ). In a finite space of the antenna module, it is a challenge to realize a broadband phased array module with better spatial coverage in fixed stepped construction.

Therefore, it is necessary to provide an improved antenna-in-Package module which increases spatial coverage.

SUMMARY OF THE INVENTION

One of the main objects of the present invention is to provides an antenna-in-package module with increased spatial coverage.

Therefore, the present invention provides an antenna-in-package module, comprising: a substrate; an antenna module; an integrated circuit chip arranged on opposite two sides of the substrate; a circuit arranged in the substrate for connecting the antenna module and the integrated circuit chip; wherein the antenna module comprises a plurality of antenna units connected to the circuit and a plurality of guiding directors arranged separated from each antenna unit, separately.

Further, the guiding directors are arranged parallel to the antenna units.

Further, each antenna unit comprises a first radiation patch, a second radiation patch arranged separated from the first radiation patch in a normal direction of the first radiation patch, and a feeding part arranged on the second radiation patch; and the first radiation patch and the second radiation patch perform coupled feeding.

Further, the guiding directors and the first radiation patches are arranged spaced from each other in a same plane.

Further, the feeding part is arranged at an end of the second radiation patch far away from the guiding director.

Further, the guiding directors and the second radiation patches are arranged spaced from each other in a same plane.

Further, each guiding director comprises a first direction guiding part arranged separated from the first radiation patch in the same plane and a second direction guiding part arranged separated from the second radiation patch in the same plane.

The present invention further provides an electronic device, comprising the antenna-in-package module as described above.

Further, the electronic device comprises a pair of the antenna-in-package modules; wherein the guiding directors of one antenna-in-package module are arranged in a spaced manner in a first direction relative to the antenna units while the guiding directors of the other antenna-in-package module are arranged in a spaced manner in a second direction relative to the antenna units; and the first direction is opposite to the second direction.

Further, the electronic device comprises a metal frame and a glass back housing, wherein an encapsulating antenna is arranged facing the glass back housing.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
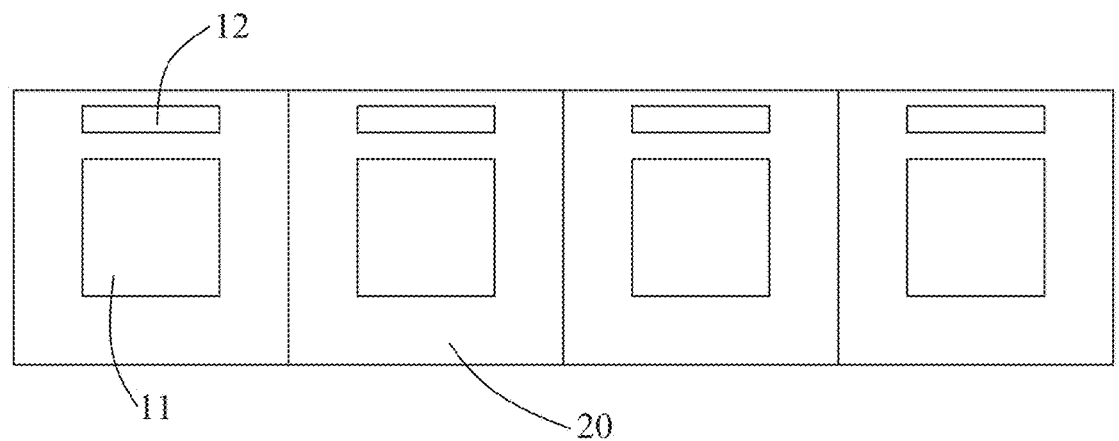
FIG. 1 is a top view of an antenna-in-package module provided by an embodiment of the present invention.
Figure 2:
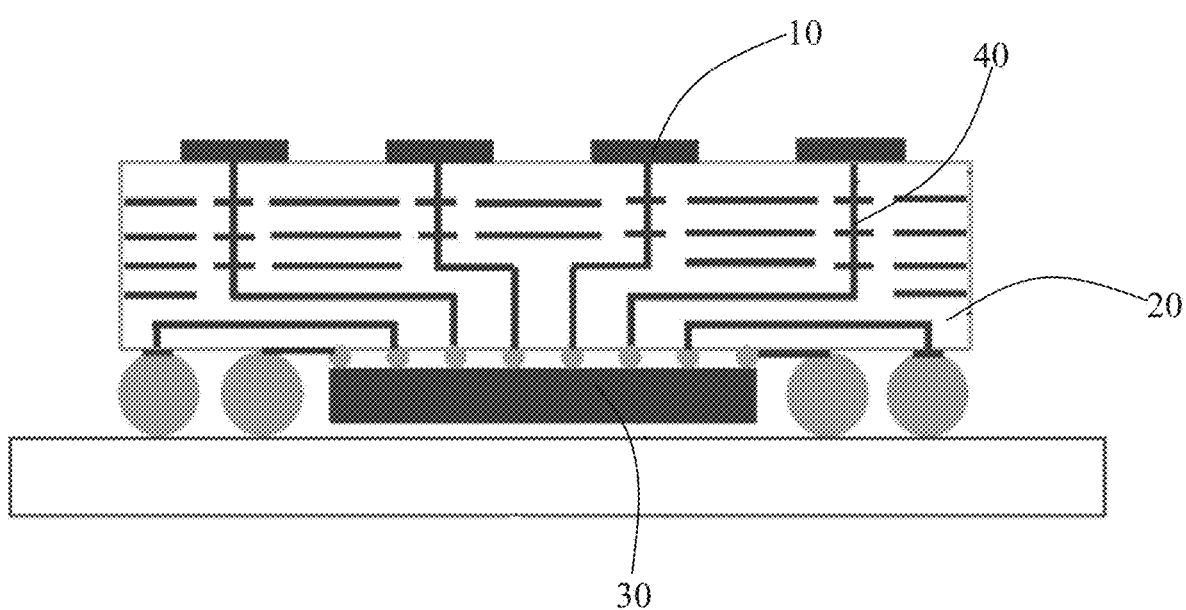
FIG. 2 is a cross-sectional view of the antenna-in-package module.

As shown in the FIG. 1 and FIG. 2, an antenna-in-Package module comprises a substrate 20, an antenna module 10 and an integrated circuit chip 30 arranged on opposite two sides of the substrate 20 and a circuit 40 arranged in the substrate 20 to connect the antenna module 10 and the integrated circuit chip 30. The antenna module 10 comprises a plurality of antenna units 11 connected to the circuit 40 and a plurality of guiding directors 12 arranged separated from each antenna unit 11, separately. By arranging the guiding directors 12, the spatial coverage of the antenna-in-Package module can be increased.

The guiding directors 12 are metal sheets, the sectional areas of the guiding directors 12 are smaller than the sectional areas of the antenna units 11, and the guiding directors 12 and the antenna units 11 are arranged in parallel and are attached to the substrate 20.

Figure 3:
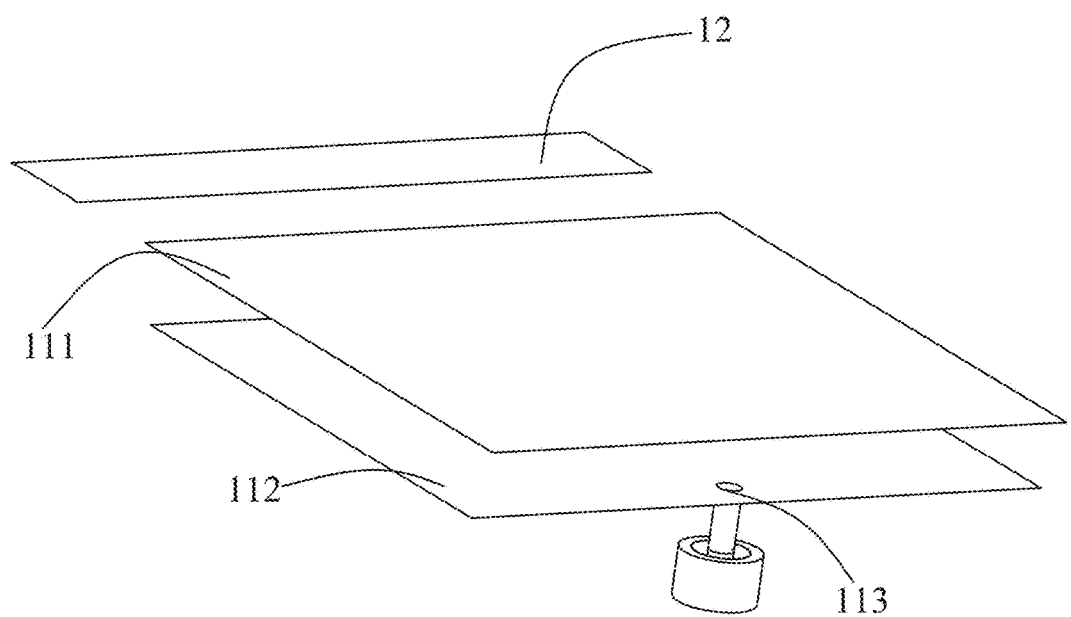
FIG. 3 is an illustration of an antenna module of the antenna-in-package module.

As shown in the FIG. 3, in the embodiment, the antenna units 11 are of double layered patch structures. Each antenna unit 11 comprises a first radiation patch 111, a second radiation patch 112 arranged separated from the first radiation patch 111 in a normal direction of the first radiation patch 111 and a feeding part 113 arranged on the second radiation patch 112. The first radiation patch 111 and the second radiation patch 112 perform coupled feeding. The guiding directors 12 and the first radiation patches 111 are arranged in a spaced manner in a same plane, and the feeding part 113 is arranged at the end, far away from each guiding director 12, of the second radiation patch 112. In other embodiments, the guiding directors 12 and the second radiation patches 112 may be arranged in a spaced manner in the same plane.

In another embodiment, each guiding director 12 comprises a first direction guiding part (not shown in the Fig.) arranged separated from the first radiation patch 111 in a same plane and a second direction guiding part (not shown in the Fig.) arranged separated from the second radiation patch 112 in a same plane, that is, guiding structures are arranged at one ends of the first radiation patch 111 and the second radiation patch 112.

In other embodiments, the antenna units 11 are of single-layered patch structures, and the guiding directors 12 are arranged on one sides of the antenna units 11.

The embodiment of the invention further provides an electronic device. The electronic device comprises the antenna-in-Package module. The electronic device at least comprises a pair of antenna-in-Package modules. The guiding directors of one antenna-in-Package module are arranged in a spaced in the first direction relative to the antenna units while the guiding directors of the other antenna-in-Package module are arranged in a spaced manner in the second direction relative to the antenna units. The first direction is opposite to the second direction. Preferably, the electronic device comprises a metal frame and a glass back housing, and an encapsulating antenna is arranged facing the glass back housing.

Figure 4:
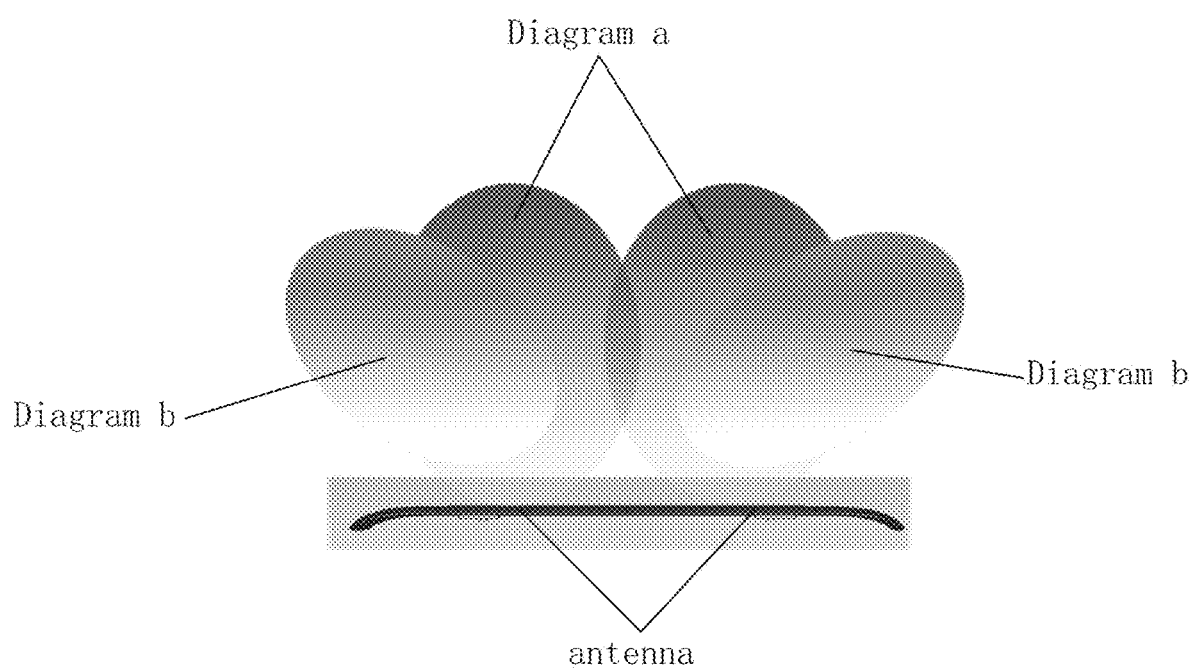
FIG. 4 is an illustration of radiation direction of the antenna-in-package module.

As shown in the FIG. 4, two ellipses corresponding to a diagram a are radiation patterns of an original antenna and two ellipses corresponding to a diagram 2 are radiation patterns of the antenna-in-Package module provided with the guiding directors 12 provided by the embodiment of the invention. A directional diagram of the diagram b inclines, so that overlapped parts of a coverage area of the antenna are reduced, and the integral coverage is increased. It is to be noted that the antenna-in-Package module provided by the embodiment of the invention can be applied to the electronic device by way of double modules or multiple modules to achieve mutual complementation of spatial coverage and is not limited by an inclination direction and a combination way shown in the Fig.

Figure 5:
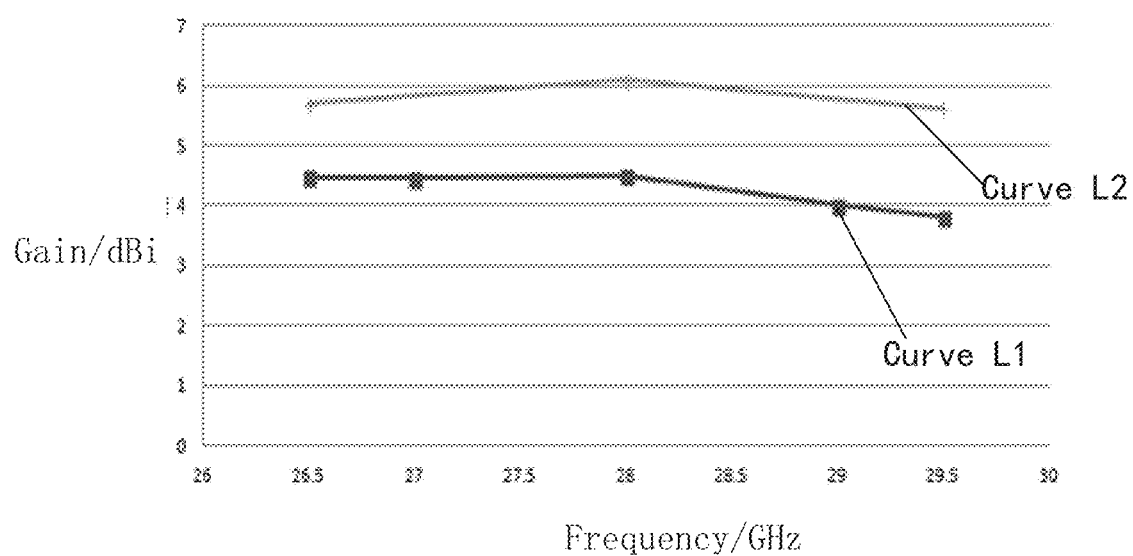
FIG. 5 is a gain curve diagram, the cumulative distribution function of which is 50%, in the pair of antenna-In-package modules, provided by the embodiment of the invention.

As shown in the FIG. 5, a curve L1 is a gain curve diagram, the cumulative distribution function of which is 50%, of the original antenna. A curve L2 is a gain curve diagram, the cumulative distribution function of which is 50%, of each antenna-in-Package module in the pair of antenna-in-Package modules. It can be seen that the radiation efficiency of the antenna-in-Package module is higher after adding the guiding directors 12.

In addition, under current prevailing full screen and metal frame ID, it is quite difficult to cover the screen side and the side surface of a mobile phone. If the antenna module is deployed on the side edge part, the integrity of the metal ID will be damaged, so that attractiveness, hand feeling, structural strength and the like are affected. In addition, it is needed to increase a connector and a connecting wire to a main board, so that an extra cost is increased. By adding the guiding directors 12, the spatial coverage performance of the antenna module can be improved greatly.

According to the antenna-in-Package module and the electronic device provided by the embodiment of the invention, the spatial coverage of the antenna-in-Package module is increased by increasing a plurality of guiding directors 12 arranged separated from each antenna unit 11 separately.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An antenna-in-package module, comprising:
a substrate;
an antenna module arranged on opposite two sides of the substrate;
an integrated circuit chip arranged on opposite two sides of the substrate;
a circuit arranged in the substrate for connecting the antenna module and the integrated circuit chip;
wherein the antenna module comprises a plurality of antenna units connected to the circuit and a plurality of guiding directors arranged separated from each antenna unit, separately;
wherein the guiding directors are arranged parallel to the antenna units;
wherein each antenna unit comprises a first radiation patch, a second radiation patch arranged separated from the first radiation patch in a normal direction of the first radiation patch, and a feeding part arranged on the second radiation patch; and the first radiation patch and the second radiation patch perform coupled feeding;
wherein each guiding director comprises a first direction guiding part arranged separated from the first radiation patch in the same plane and a second direction guiding part arranged separated from the second radiation patch in the same plane.

2. The antenna-in-package module as described in claim 1, wherein the guiding directors and the first radiation patches are arranged spaced from each other in a same plane.

3. The antenna-in-package module as described in claim 2, wherein the feeding part is arranged at an end of the second radiation patch far away from the guiding director.

4. The antenna-in-package module as described in claim 1, wherein the guiding directors and the second radiation patches are arranged spaced from each other in a same plane.

5. An electronic device, comprising the antenna-in-package module as described in claim 1.

6. The electronic device as described in claim 5 comprising a pair of the antenna-in-package modules; wherein the guiding directors of one antenna-in-package module are arranged in a spaced manner in a first direction relative to the antenna units while the guiding directors of the other antenna-in-package module are arranged in a spaced manner in a second direction relative to the antenna units; and the first direction is opposite to the second direction.

7. The electronic device as described in claim 6, comprising a metal frame and a glass back housing, wherein an encapsulating antenna is arranged facing the glass back housing.

* * * * *